(12) United States Patent
Rodriguez

(10) Patent No.: US 7,543,678 B2
(45) Date of Patent: Jun. 9, 2009

(54) FLOATING TORQUE TUBE PROPELLER SHAFT ASSEMBLY

(75) Inventor: Rolando V. Rodriguez, Metamora, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 319 days.

(21) Appl. No.: 11/419,347

(22) Filed: May 19, 2006

(65) Prior Publication Data

US 2007/0267245 A1 Nov. 22, 2007

(51) Int. Cl.
*B60K 17/24* (2006.01)
(52) U.S. Cl. .................. 180/380; 180/381; 464/52; 464/180
(58) Field of Classification Search ......... 180/376–385, 180/348, 353; 464/52, 180, 179
See application file for complete search history.

(56) References Cited

U.S. PATENT DOCUMENTS

| | | | | |
|---|---|---|---|---|
| 2,027,329 A | * | 1/1936 | Van Ranst | 180/380 |
| 2,067,287 A | * | 1/1937 | Pearce | 180/380 |
| 2,082,826 A | * | 6/1937 | Frisby | 180/344 |
| 5,566,721 A | | 10/1996 | Breese | |
| 5,637,042 A | | 6/1997 | Breese | |
| 5,643,093 A | | 7/1997 | Breese | |
| 5,983,497 A | | 11/1999 | Breese et al. | |
| 6,234,911 B1 | | 5/2001 | Breese et al. | |
| 6,572,199 B1 | | 6/2003 | Creek et al. | |
| 6,792,660 B1 | | 9/2004 | Breese | |
| 6,811,455 B2 | | 11/2004 | Rodriguez | |
| 6,896,623 B2 | | 5/2005 | Creek | |
| 2006/0283678 A1 | * | 12/2006 | Murakami | |

* cited by examiner

*Primary Examiner*—Ruth Ilan
*Assistant Examiner*—Drew J. Brown

(57) ABSTRACT

A torque tube propshaft assembly having an outer tube free to float with movements of an inner shaft (propshaft) by being free of rigid anchorage at each end. A plurality of shaft bearings interface the outer tube with the inner shaft, wherein the outer tube is generally co-extensive with the inner shaft. An anti-rotation mechanism prevents rotation of the outer tube with respect to the frame of the motor vehicle. An axial slip mechanism is integrated with at least one end of the inner shaft. A non-welded construction of the power carrying components is provided. The outer tube provides bending support so the inner shaft does not become dynamically unstable at any rotation speed including its critical speed.

18 Claims, 3 Drawing Sheets

US 7,543,678 B2

FLOATING TORQUE TUBE PROPELLER SHAFT ASSEMBLY

TECHNICAL FIELD

The present invention relates to propeller shafts used in motor vehicles for transmitting rotational torque from one component to another, as for example from a transmission to a drive axle. More particularly, the present invention relates to a reduced cross-section propeller shaft supported by bearings with respect to a floating, non-rotating outer support tube.

BACKGROUND OF THE INVENTION

A motor vehicle generally utilizes a propeller shaft (also referred to as a driveshaft or propshaft, and for brevity the term propshaft will be used hereinafter) to transfer the rotating mechanical force (torque) generated by the engine/transmission to the driving wheels of the vehicle, which, in turn, propel the vehicle. For example, a propshaft is used for connecting the transmission or transfer case (in the case of four or all wheel drive vehicles) to the driving axle(s). Propshafts can either be single piece, as for example shown at FIGS. 1A and 1B, or multi-piece, as for example shown at FIG. 1C.

A single piece propshaft assembly 10 includes a shaft 12, which is usually a tube of metal material M having a length L and a radius R; a pair of articulating joints 14, 16 at each end 12a, 12b of the shaft; and an axial slip interface 18, usually via splines, at, usually, only one or the other of the articulating joints. In this manner, the ends of the shaft drivingly connect components of the motor vehicle, as for example a transmission 20 to a rear drive axle 22. Alternatively, the prior art has also used splines at the ends of the propshafts as the means of connecting to the end yokes, whereby the need to utilize welds to join these components is eliminated.

A multi-piece propshaft assembly 30 has first and second shafts 32, 34, which are connected through a bearing support 36, wherein distal ends 32a, 34b of the first and second shafts are connected, respectively, to an articulating joint 38, 40. The bearing support 36 is affixed to a frame member of the motor vehicle and bearingly supports a splined stub shaft 44 which is attached to one end 32b of the first shaft 32 and interfaces with a splined slip yoke 45 which supports a third universal joint 46 that is connected with the second shaft 34. The splined interface forms a slip mechanism 48. In this manner, the ends of the first and second shafts drivingly connect components of the motor vehicle, as for example a transmission 50 to a rear drive axle 52.

A relatively rare propshaft design is the torque tube assembly 60, for example shown at FIG. 1D. This design incorporates a rotating shaft 62 that may be a solid rod or a hollow tube that transmits power and is supported by multiple bearings 64 encased by a stationary, rigid outer tube or beam 66 that is rigidly anchored 68a, 68b at each end to a respective drive component 70, 72. The torque tube assembly 60 has been used in automotive applications over the years where there is no relative motion between the ends, as for example in one form or another in the General Motors Corvette and the Porsche 944 and 928. In recent years, the outer tube has acted as a powerplant structural component as seen on sports car vehicle applications where the torque tube connects the engine to the transmission. In American vehicles of the 1930s and 1940s, a torque tube assembly was rigidly anchored to the driving axle and to the transmission with the addition of a "torque ball joint" that allowed angular misalignment between the torque tube shaft and the transmission shaft to occur near the connection at the transmission. This arrangement does not permit operation between any non-parallel shafts as it requires the shafts to intercept at the joint. Rigidly anchoring the torque tube to a solid beam driving axle and powerplant has significant disadvantages because the mass and inertia of the powerplant have influence on vehicle handling dynamics.

With regard to considerations of propshafts and their relation to the motor vehicle architecture, the space in the underbody of a vehicle is at a premium in order to maximize space for passengers and cargo, so it is desirable from that standpoint for the diameter of propshaft to be minimized while still meeting mechanical requirements of the propshaft. It is also desirable to minimize the weight of vehicle components, including the propshaft, in order to improve performance and fuel economy.

Of concern in the selection of propshafts is that they can become dynamically unstable if operated at rotational speeds where the propshaft residual imbalance forces excite the propshaft bending modes of vibration, also known as the propshaft natural bending frequencies. The rotational speed coinciding with the first bending mode of vibration (natural bending frequency) is known as the propshaft critical speed. The low dampening properties of typical materials used in the construction of propshafts result in bending stresses that quickly increase at resonance and can cause a propshaft fracture.

Factors influencing the resonance bending frequency are selection of material, the diameter, and the length of the propshaft, wherein as the length increases, the resonance frequency decreases, and so does the critical speed. Therefore, longer propshafts typically require the use of larger diameter, lighter and more rigid materials to meet critical speed requirements.

FIG. 1E is a graphic representation 80 of the appearance of propshaft bending stress (pounds per square inch) as a function of propshaft rotation speed, indicative of the propshaft critical speed A, B, C for various designs of propshafts. In this regard, propshaft critical speed A is indicative of a large diameter propshaft, and the other critical speeds B and C are for progressively small diameter propshafts.

A conventional design propshaft is not allowed to operate at or very near its critical speed. In this regard, the operational rotation speed range A' is for propshaft critical speed A; the operational rotation speed range B' is for propshaft critical speed B; and the operational rotation speed range C' is for propshaft critical speed C.

Multi-piece propshafts have been used to overcome the problems associated with a long single piece propshaft. Each shorter piece has a comparatively higher resonance frequency. Overall, this gives the multi-piece propshaft a higher critical speed.

While multi-piece propshafts overcome some of the deficiencies of single piece propshafts, they introduce other problems. For example, multi-piece propshafts tend to exhibit launch shudder. Launch shudder is a severe vibration that occurs when the vehicle starts from a standstill or is driven at low speed during high powertrain torque events. In the case of a multi-piece (two piece) propshaft as discussed above with respect to FIG. 1C, a stationary center bearing support and an additional joint are introduced where the two pieces of the propshaft come together. The center joint allows the rear propshaft piece to operate at different angles from the front piece. Typically, the stationary center support attaches the front piece of the propshaft to the vehicle chassis or body structure. Since the transmission is also attached to the vehicle structure, the front piece of the propshaft does not move much during vehicle operation. However, the same cannot be said for the rear piece of the propshaft on vehicles with solid beam drive axles with Hotchkiss (leaf spring) or link coil spring suspension systems. Relative to the vehicle, the position of the rear propshaft joint moves vertically (see V in FIG. 1C) during operation of the vehicle. For example, when a vehicle's payload is increased or decreased, the rear joint moves as the vehicle body moves toward or away from the axle. This movement alters the joint operating angles (see $\alpha$ in FIG. 1C) on the propshaft piece attached to the axle.

Launching a typical vehicle with a multi-piece propshaft with universal joints and a Hotchkiss suspension, the leaf springs deflect under the influence of the driving torque changing the orientation of the axle and increasing joint operating angles. Applying driving torque to a universal joint operating at angle generates secondary couples perpendicular in direction to the driving torque. The magnitude of these couples increase with increased angle and increased driving torque. Furthermore, the couple magnitudes oscillate at a frequency of twice per propshaft revolution and exert oscillating forces at every propshaft support. These oscillating forces are the cause of the launch shudder vibration. Launch shudder severity typically increases with higher payload, heavier throttle application, trailering and operating the vehicle up a grade.

Launch shudder is much less likely to occur in single piece propshafts because the degree of freedom introduced by the center joint is eliminated, the joint operating angles are smaller in magnitude, the distance between the joints is greater and the distance between the propshaft supports is greater. All these factors minimize the dynamic forces originating from the universal joint secondary couples and exerted on the propshaft supports.

In addition to the above noted distinctions between single and multi-piece propshafts, other factors also influence the selection of a propshaft. Single piece propshafts are simpler to engineer, and thus are less expensive to manufacture compared to multi-piece propshafts. In addition, multi-piece propshafts typically are more than double the weight of comparable length single piece propshafts.

Accordingly, what remains needed in the art is a solution to all of the above stated problems via a re-engineered propshaft assembly capable of operating at current vehicle operating speeds, and featuring: elimination of launch shudder, greatly reduced the shaft's dynamic imbalance forces, greatly improved durability life of the propshaft assembly, and reduced ability of the propshaft to transmit or amplify other vehicle generated noises such as drive axle hypoid gear noise and reducing spline friction related "clunk" or "grunt" noises.

SUMMARY OF THE INVENTION

The present invention is a re-engineered propshaft assembly capable of operating at current vehicle operating speeds, and featuring: elimination of launch shudder, greatly reduced the shaft's dynamic imbalance forces, greatly improved durability life of the propshaft assembly, and reduced ability of the propshaft to transmit or amplify other vehicle generated noises such as drive axle hypoid gear noise and reducing spline friction related "clunk" or "grunt" noises.

The present invention is a torque tube propshaft assembly where a rigid outer tube or beam (torque tube) is free to float with movements of an inner shaft (propshaft) by being free at each end (that is, not rigidly anchored at either end). The torque tube propshaft assembly according to the present invention incorporates a bearing interface (i.e., a plurality of shaft bearings) between the outer tube and the inner shaft, wherein the outer tube is generally co-extensive with the inner shaft, but is yet unconnected (and spaced from any possibly interfering structures) at either end thereof so as to be freely movable together with the inner shaft.

An anti-rotation mechanism prevents rotation of the outer tube with respect to the frame of the motor vehicle. The anti-rotation mechanism prevents the outer tube from spinning from the frictional or drag forces transmitted by the spinning inner shaft through the shaft bearings. The anti-rotation mechanism can be customized to a particular application, as for example a flexible belt, cable or chain anchored to the outer tube or looped over the outer tube and anchored to the vehicle frame; a flexible mount anchoring the outer tube to the vehicle frame; a link connecting the outer tube and the vehicle frame; or a flexible boot enclosing one or both articulating joints and flexibly connecting the outer tube end(s) to the driving axle and/or the transmission. In the case of the boot, added functionality is provided by the inherent protection of the power transmitting components from the vehicle underbody environment and extending the torque tube assembly operating life by greatly slowing down corrosion related failure modes. The boot also would serve to protect the transmission rear shaft seal and the driving axle pinion seal from the external environment.

Preferred features of the torque tube propshaft assembly according to the present invention include an integral axial slip mechanism at least one end of the inner shaft and non-welded construction of the power-carrying components. The integral slip mechanism incorporates splines fabricated at the inner shaft end(s) that interface with splined yokes. One of these splined connections may be anchored with each other to force all shaft axial motion to occur at the opposite end. Aligning the longitudinal axis of the splines with the axis joining the articulating joints ensures that the axial forces generated when the distance between the shaft's attaching ends changes are aligned with the spline slip axis. This feature reduces the probability that the splines will bind under driving torque and become a source of noise or vibration during certain vehicle operations. The use of splines as the means of connecting to the end yokes eliminates the need to utilize welds to join these components in a manner generally known to be done with respect to conventional propshafts. Welding reduces component strength which is essential to transmit high driving torque with relatively small diameter shafts. This construction also allows the inner shaft to be completely disassembled to service any worn components after extended vehicle operation.

Accordingly, it is an object of the present invention to provide a propshaft assembly capable of operating at current vehicle operating speeds, and featuring: elimination of launch shudder, greatly reduced the shaft's dynamic imbalance forces, greatly improved durability life of the propshaft assembly, and reduced ability of the propshaft to transmit or amplify other vehicle generated noises such as drive axle hypoid gear noise and reducing spline friction related "clunk" or "grunt" noises.

This and additional objects, features and advantages of the present invention will become clearer from the following specification of a preferred embodiment.

DESCRIPTION OF THE PREFERRED EMBODIMENT

Figure 1A:
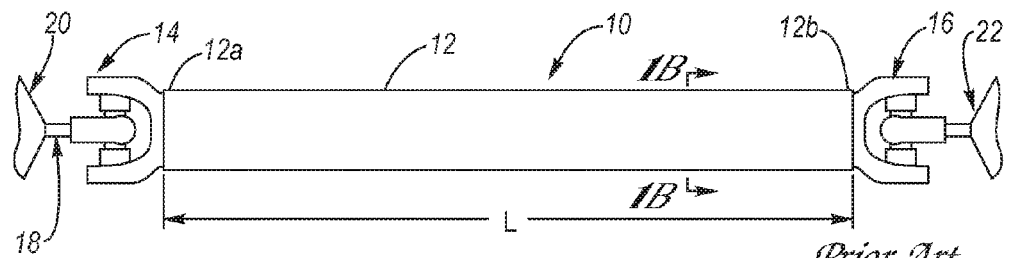
FIG. 1A is a side view of a prior art single piece propshaft assembly.
Figure 1B:
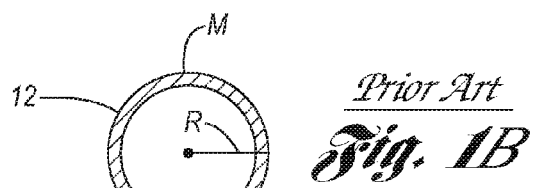
FIG. 1B is a sectional view, seen along line 1B-1B of FIG. 1A.
Figure 1C:
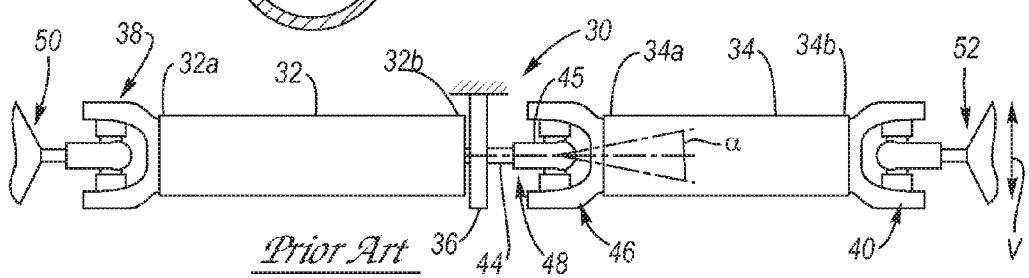
FIG. 1C is a side view of a prior art multi-piece propshaft assembly.
Figure 1D:
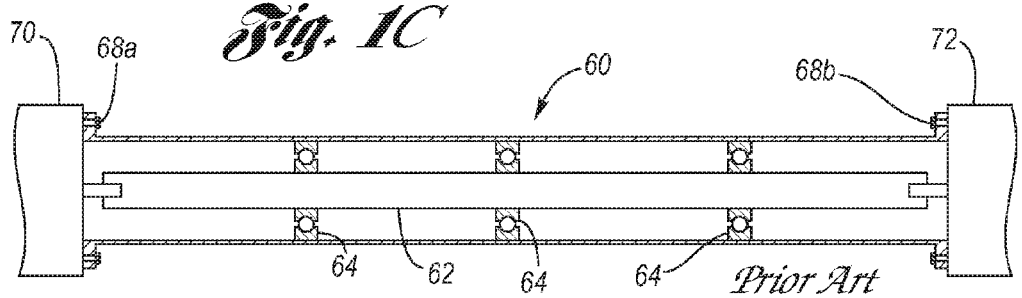
FIG. 1D is a side view of a prior art torque tube assembly in which the outer tube is fixedly anchored at both ends.

Referring now to the Drawing, FIGS. 2 through 7 depict aspects of the torque tube propshaft assembly according to the present invention.

Figure 1E:
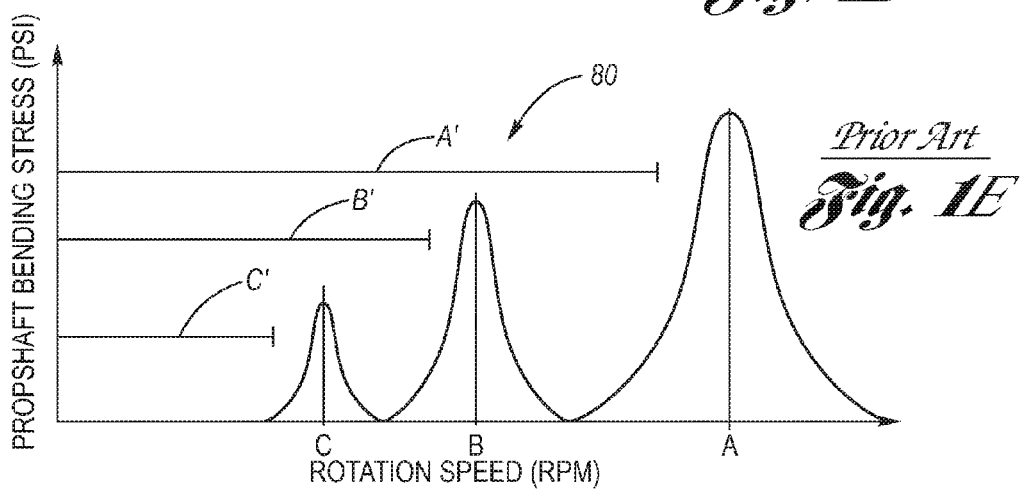
FIG. 1E is a graphical representation of propshaft bending stress as a function of propshaft rotation speed for various propshafts.
Figure 2:
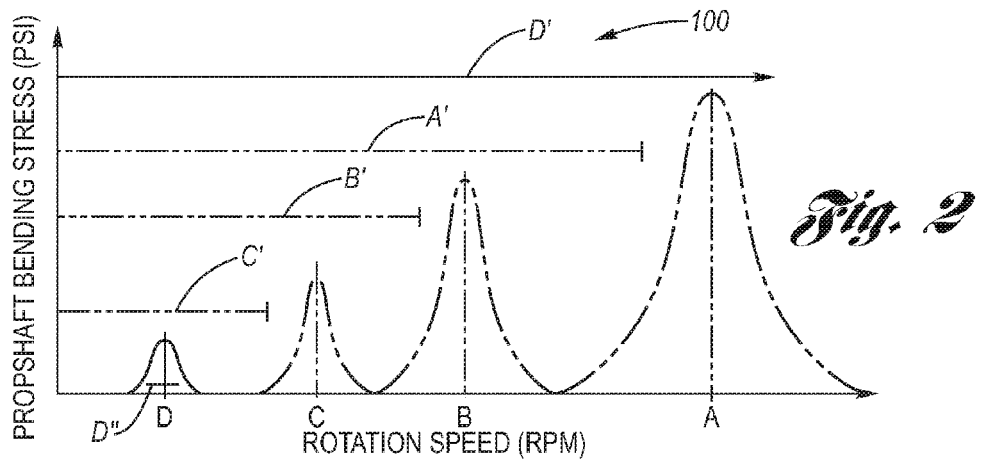
FIG. 2 is a graphical representation of propshaft bending stress as a function of propshaft rotation speed for the torque tube propshaft assembly according to the present invention.

The theory of operation behind the present invention can be understood with reference to FIG. 2. Like FIG. 1E, FIG. 2 is a graphic representation 100 of the appearance of the propshaft bending stress as a function of propshaft rotation speed, wherein the propshaft critical speeds A, B, C for various designs of propshafts are now shown in phantom for comparison purposes. As is readily seen, a small diameter propshaft would have a low critical speed D, but one also sees that the bending stress at the first bending mode of vibration is much lower than the comparative values for A, B and C. Inevitably, the propshaft rotational speed within normal operational speeds of the motor vehicle will include this critical speed D, it cannot be avoided by operating the motor vehicle at propshaft rotation speeds therebelow. However, it is notable that the propshaft bending stress at the first bending mode of vibration is progressively less as the rotation speed thereof is lowered, meaning less energy is involved at the resonance. In the prior art, the solution to avoid the problems of the first bending mode of vibration is to increase the bending stiffness of the propshaft, as for example from design C towards A.

However, it is the insight of the present invention, which runs counter intuitive to this standard teaching of the prior art, to solve the problem of the first bending mode of vibration to make this at a low rotation speed, whereat the bending stress thereof is small, then to provide a free floating, rigid outer tube to provide support and damping to further reduce the bending stress of the inner shaft (see D" of FIG. 2), so that now virtually any rotation speed is an acceptable operational rotation speed range D'.

Figure 3:
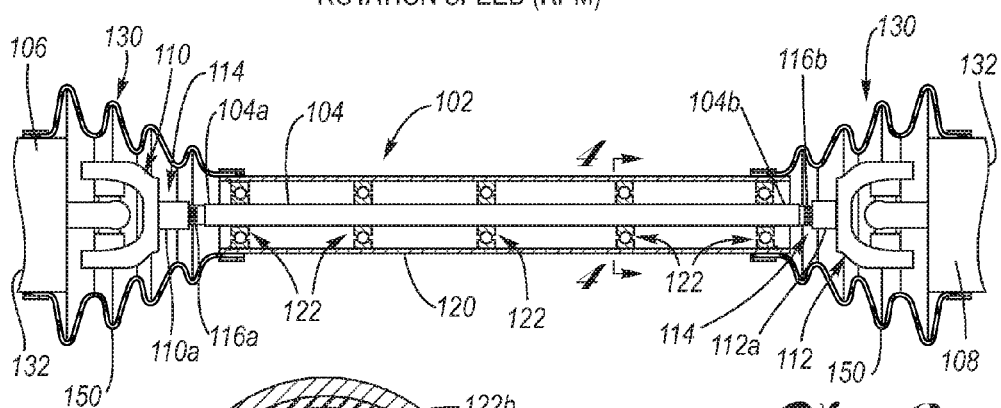
FIG. 3 is a partly sectional side view of a first embodiment of the torque tube propshaft assembly according to the present invention.
Figure 4:
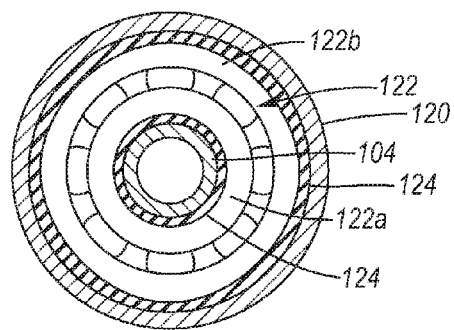
FIG. 4 is a sectional view, seen along line 44 of FIG. 3.
Figure 5:
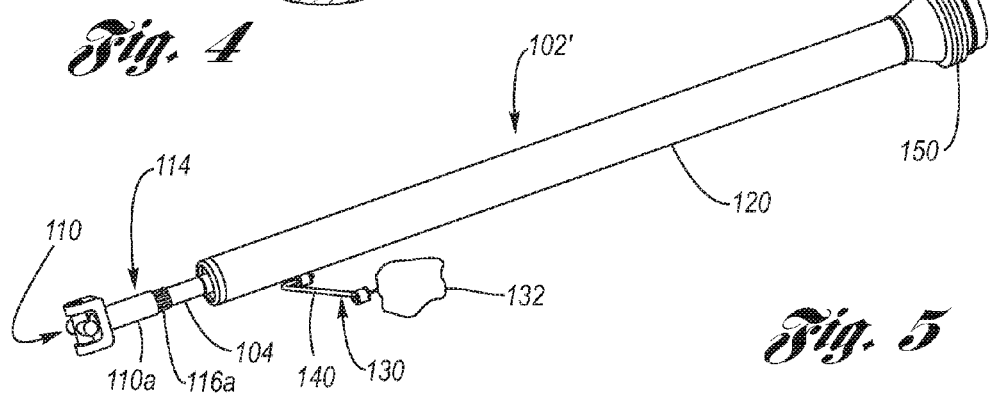
FIG. 5 is a perspective side view of a second embodiment of the torque tube propshaft assembly according to the present invention.
Figure 6:
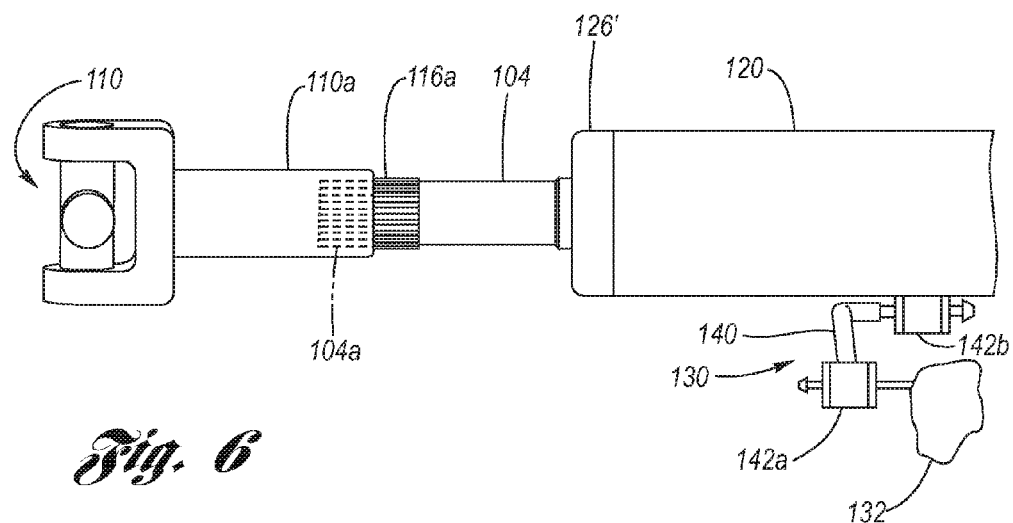
FIG. 6 is a detail side view of an axial slip mechanism of the torque tube propshaft assembly of FIG. 5.
Figure 7:
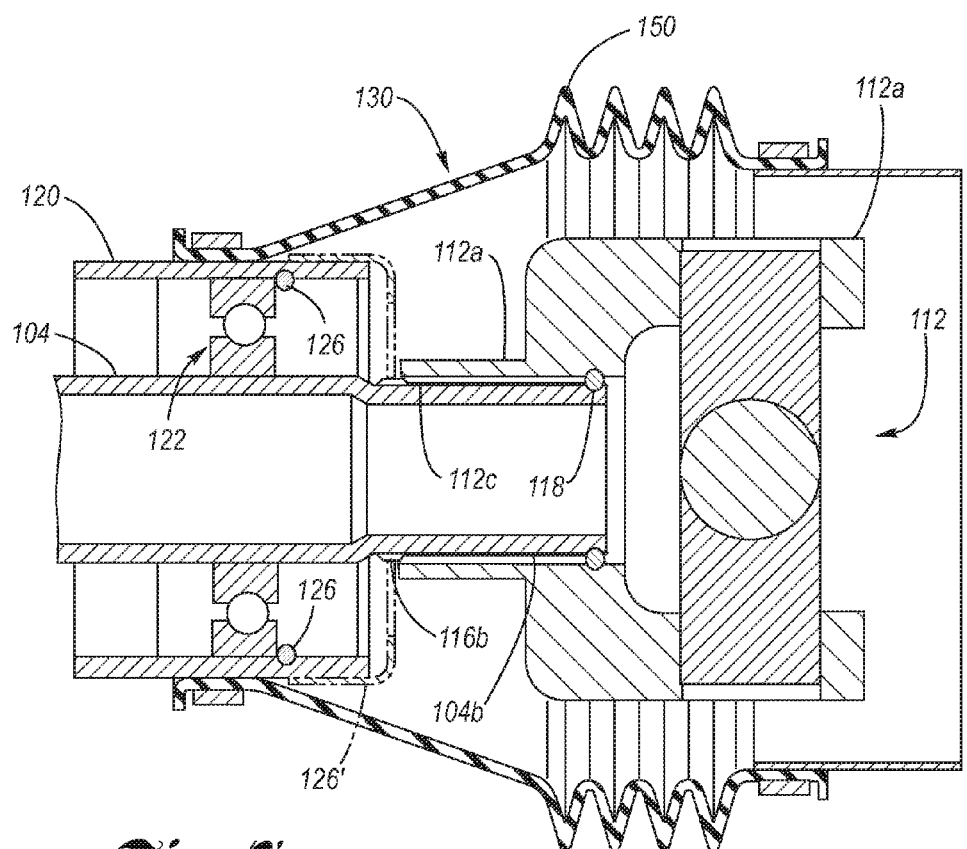
FIG. 7 is a detail side view of a booted end interface of the torque tube propshaft assembly of FIG. 5.

Attention is now directed to FIGS. 3 and 4, wherein a first preferred embodiment of the torque tube propshaft assembly 102 according to the present invention is depicted, and further directed to FIGS. 5 through 7, wherein a second embodiment of the torque tube propshaft assembly 102' is depicted, wherein the difference therebetween relates to anti-rotation mechanisms, as will be discussed hereinbelow.

The torque tube propshaft assembly 102 includes an inner shaft (propshaft) 104, which may be a hollow tube or a solid rod (a hollow tube being shown at FIG. 4 merely by way of example). The inner shaft 104 serves to transmit rotational power, typically, between two drive components 106, 108, as for example the powerplant (engine/transmission) and the driven axle(s).

Articulating joints 110, 112 are located at each end 104a, 104b of the inner shaft 104, respectively, so as to allow for operation between non-parallel shafts of the two drive components. These articulating joints 110, 112 are typically universal or Cardan joints, but could also be any other kind including constant velocity joints or flex couplings.

At least one axial slip mechanism 114 is provided which allows operation while the distance between the drive components 106, 108 varies. The axial slip mechanism is preferably provided by a sliding interconnection such as a spline or a rolling connection such as a plunging constant velocity joint. For example (see in particular FIG. 6), the inner shaft 104 preferably incorporates splines 116a, at end 104a which drivingly engage the splined yoke 110a that supports the articulating joint 110. Alternatively, the axial slip mechanism 114 may be part of the function of at least one plunging constant velocity joint. In this case, the inner shaft splines attach to the splines on the constant velocity joint inner race inner diameter. The axial slip mechanism 114 may be located at either or both ends 104a, 104b of the inner shaft 104. This may be desirable to reduce manufacturing costs and to facilitate service. If only one axial slip mechanism 114 is used, features to prevent motion (i.e., a pin, threaded fasteners, interference, spiral angle added to the spline, or controlling the spline fit, etc.) must be provided to the non-axially sliding spline. FIG. 7 shows details of a stationary (non-axially sliding) spline connection showing a splined yoke 112a, with splines 112c, interfacing with inner shaft splines 116b, and an interference provided retaining ring 118 seating into an annular recess.

A rigid outer tube (or beam) 120, concentrically surrounds the inner shaft 104 for at least most of its length (i.e., being substantially co-terminal therewith). The outer tube 120 serves to provide bending stiffness to the inner shaft 104 via a plurality of shaft bearings 122. The shaft bearings 122 may include isolating and/or damping material 124 between the inner shaft 104 and the bearing inner race 122a and/or between the bearing outer race 122b and the outer tube 120 so as to provide minimization of transfer of vibration between the inner shaft and the outer tube. Bearing retainers may be provided at each end 120a, 120b of the outer tube 120 which serve to prevent the outer tube from sliding out of its intended positional relationship with the inner shaft 104; however, it is desirable that the bearing retainers be removable to allow disassembly for service, as for example by inner press fit bearing retainers 126, visible in FIG. 3 and labeled in FIG. 7, or by an outer cap 126' shown at FIG. 6 and in phantom at FIG. 7.

An anti-rotation mechanism 130 prevents the outer tube 120 from rotating with the rotation of the inner shaft 104, wherein it is preferred for the outer tube to be stationary with the motor vehicle frame (some small rotary movement, as for example a rocking movement may occur as the propshaft follows the movement of its attaching ends while it is supported by the anti-rotation mechanism) while at the same time the ends 120a, 120b are not rigidly anchored to any motor vehicle component external thereto (they may be internally rotatably connected to the inner shaft via the shaft bearings) so that the outer tube floats with movement of the inner shaft.

The anti-rotation mechanism 130 may be configured from many suitable structures, wherein the anti-rotation mechanism provides a resilient connection between the outer tube 120 and a non-rotating component 132 of the motor vehicle. As shown at FIGS. 5 and 6, a preferred form of anti-rotation mechanism 130 is a link (or lever) 140 pivotally anchored to a non-rotating component 132 of the vehicle and pivotally connected to the outer tube 120. The link 140 preferably incorporates isolator bushings 142a, 142b to reduce the transmission of vibration from the outer tube to the motor vehicle, generally. The anti-rotation mechanism 130 can also be provided by attaching a flexible cable, belt or chain looped around the outer tube 120 or attached to the outer tube and anchored at one end to a non-rotating component of the motor vehicle.

A flexible boot 150 can be attached to one or both ends 120a, 120b of the outer tube 120 and a respectively adjacent drive component of the motor vehicle, thereby enclosing the articulating joint(s) and adding protection to the power carrying components from the underbody environment, while at the same time providing another anti-rotation mechanism 130. The flexible boots 150 are a desirable feature that extends the operating life of components enclosed by the outer tube 120 and also the seals that retain fluid at the attaching ends such as the driven axle(s) pinion seal and the powerplant output shaft seal.

The inner shaft 104 design parameters are optimized to obtain a lower natural bending frequency when compared to the outer tube 120. The outer tube 120 is not rigidly anchored to the drive axle case or carrier, which is in contradistinction with respect to a conventional torque tube design where there is a cantilever connection with no degrees of freedom of movement. The outer tube 120 provides sufficient bending support so the inner shaft 104 does not become dynamically unstable at any speed including its own critical speed. It is desirable to minimize the bending stiffness of the inner shaft 104 to minimize its unsupported natural bending frequency. An inner shaft 104 with a low natural bending frequency is much easier to dampen or support than a conventional unsupported open propshaft design with a much higher critical speed; therefore, by designing the outer tube 120 with this in mind, the vibration energy generated by the inner shaft 104 at its natural bending frequency is not significant and the torque tube propshaft assembly 102, 102' can operate smoothly over a wide range of rotational speeds of the inner shaft. The outer tube 120 exhibits a higher natural bending frequency which allows it to be a bending support to the inner shaft 104 while the inner shaft is at its critical rotation speed. The inner shaft 104 does not significantly excite the outer tube 120 at the rotational speed which coincides with the natural bending resonance of the outer tube because the outer tube is stationary or substantially stationary.

The relatively small diameter of the inner shaft 104 reduces the magnitude of residual dynamic imbalance forces. This is an advantage over the conventional open propshaft construction where relatively large diameters are required to prevent the propshaft to operate at or near its critical speed. Larger diameter tubes magnify the effects of tube imperfections such as runout, ovality, wall thickness variation and damage to the tube which can occur during manufacturing of the propshaft, installation of the propshaft into the vehicle or during vehicle operation.

The torque tube propshaft assembly 102, 102' exhibits reduced radiated noise levels when compared to conventional open propshafts for several reasons. The relatively small diameter of the inner shaft 104 yields a much smaller area to radiate any noise energy transmitted across the shaft. The outer tube 120 acts as a shield to noise radiated by the inner shaft 104. The shaft bearings 122 with the isolators 124 act to dampen the bending, shell and torsional vibration modes of the outer tube.

The design parameters of the inner shaft 104, the outer tube 120, the selected number of shaft bearings 122, the relative position of the shaft bearings and the design parameters of the bearing isolators 124 is such that collectively these considerations allow for smooth operation over a wide rotational speed range including the highest attainable speeds which may exceed 5,600 inner shaft 104 (propshaft) revolutions per minute.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A floating torque tube propeller shaft assembly for a motor vehicle, said assembly comprising:
   a rigid outer tube having a first outer tube end and an oppositely disposed second outer tube end;
   an inner shaft having a first inner shaft end and an oppositely disposed second inner shaft end, said inner shaft being received in said outer tube; and
   a plurality of shaft bearings rotatably supporting said inner shaft with respect to said outer tube;
   wherein said first and second outer tube ends are free to float with movements of said inner shaft by being free of rigid anchorage.

2. The assembly of claim 1, further comprising an anti-rotation mechanism connected to said outer tube and adapted for connection to the motor vehicle.

3. The assembly of claim 2, wherein said anti-rotation mechanism comprises at least one resilient boot connected to at least one of said first and second outer tube ends and adapted for connection to the motor vehicle.

4. The assembly of claim 2, wherein said anti-rotation mechanism comprises a link pivotally connected to said outer tube and adapted for pivotal connection to the motor vehicle.

5. The assembly of claim 1, further comprising:
   an axial slip mechanism connected to at least one of said first and second shaft ends;
   a first articulating joint connected with said first shaft end; and
   a second articulating joint connected to said second shaft end;
   wherein said axial slip mechanism is located at the connection of at least one of said first and second articulating joints and said inner shaft.

6. The assembly of claim 1, further comprising retainer means for maintaining a predetermined axial position relationship between said inner shaft and said outer tube.

7. The assembly of claim 1, wherein each shaft bearing of said plurality of bearings comprises a vibration isolator which isolates vibration between said inner shaft and said outer tube.

8. The assembly of claim 1, wherein said outer shaft is substantially co-extensive with said inner shaft.

9. The assembly of claim 1, wherein said outer tube has a preselected tube bending frequency, wherein said inner shaft has a preselected unsupported shaft bending frequency, and wherein said inner shaft bending frequency is small in relation to said tube bending frequency; and wherein said inner shaft has a selected bending stiffness which is preselected to minimize said shaft bending frequency.

10. The assembly of claim 9, further comprising:
    an anti-rotation mechanism connected to said outer tube and adapted for connection to the motor vehicle;
    an axial slip mechanism connected to at least one of said first and second shaft ends; and retainer means for maintaining a predetermined axial position relationship between said inner shaft and said outer tube;
wherein each shaft bearing of said plurality of bearings comprises a vibration isolator which isolates vibration between said inner shaft and said outer tube; and
wherein said outer shaft is substantially co-extensive with said inner shaft.

11. A motor vehicle incorporating a floating torque tube propeller shaft assembly, comprising:
a motor vehicle comprising a plurality of components including a first drive component, and a second drive component;
a rigid outer tube having a first outer tube end and an oppositely disposed second outer tube end;
an inner shaft having a first inner shaft end and an oppositely disposed second inner shaft end, said inner shaft being received in said outer tube, said inner shaft being drivingly connected to said first and second drive components; and
a plurality of shaft bearings rotatably supporting said inner shaft with respect to said outer tube;
wherein said first and second outer tube ends are free to float with movements of said inner shaft by being free of rigid anchorage to a motor vehicle component external to said outer tube.

12. The motor vehicle of claim 11, further comprising an anti-rotation mechanism connected between said outer tube and a motor vehicle component non-rotating with respect to said inner shaft.

13. The motor vehicle of claim 11, further comprising retainer means for maintaining a predetermined axial position relationship between said inner shaft and said outer tube.

14. The motor vehicle of claim 11, wherein said outer shaft is substantially co-extensive with said inner shaft.

15. The motor vehicle of claim 11, further comprising:
an axial slip mechanism connected to at least one of said first and second shaft ends;
a first articulating joint connected with said first shaft end; and
a second articulating joint connected to said second shaft end;
wherein said axial slip mechanism is located at the connection of at least one of said first and second articulating joints and said inner shaft.

16. The motor vehicle of claim 11, wherein each shaft bearing of said plurality of bearings comprises a vibration isolator which isolates vibration between said inner shaft and said outer tube.

17. The motor vehicle of claim 11, wherein said outer tube has a preselected tube bending frequency, wherein said inner shaft has a preselected unsupported shaft bending frequency, and wherein said shaft bending frequency is small in relation to said tube bending frequency; and wherein said inner shaft has a selected bending stiffness which is preselected to minimize said shaft bending frequency.

18. The motor vehicle of claim 17, further comprising:
an anti-rotation mechanism connected to said outer tube and adapted for connection to the motor vehicle;
an axial slip mechanism connected to at least one of said first and second shaft ends; and
retainer means for maintaining a predetermined axial position relationship between said inner shaft and said outer tube;
wherein each shaft bearing of said plurality of bearings comprises a vibration isolator which isolates vibration between said inner shaft and said outer tube; and
wherein said outer shaft is substantially co-extensive with said inner shaft.

* * * * *